(12) United States Patent
Penno et al.

(10) Patent No.: US 8,701,179 B1
(45) Date of Patent: Apr. 15, 2014

(54) SECURE NETWORK ADDRESS TRANSLATION

(75) Inventors: Reinaldo Penno, San Jose, CA (US);
Sarat Kamisetty, Fremont, CA (US);
Alexander Arseniev, Guidford (GB);
Rajesh Mohan, Cupertino, CA (US);
Mayuresh Bakshi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 64 days.

(21) Appl. No.: 13/433,016

(22) Filed: Mar. 28, 2012

Related U.S. Application Data

(60) Provisional application No. 61/556,003, filed on Nov. 4, 2011.

(51) Int. Cl.
*G06F 15/16* (2006.01)
*H04L 29/06* (2006.01)
*H04L 29/12* (2006.01)

(52) U.S. Cl.
CPC ............ *H04L 63/02* (2013.01); *H04L 63/0263* (2013.01); *H04L 61/255* (2013.01); *H04L 61/2553* (2013.01)
USPC ................. 726/13; 726/11; 726/12; 709/227; 709/228; 709/229

(58) Field of Classification Search
CPC ... H04L 63/02; H04L 63/0263; H04L 61/255; H04L 61/2553
USPC ................................ 726/11–13; 709/227–229
See application file for complete search history.

(56) References Cited

U.S. PATENT DOCUMENTS

| | | | | |
|---|---|---|---|---|
| 6,006,269 A * | 12/1999 | Phaal | ............................ | 709/227 |
| 6,571,287 B1 * | 5/2003 | Knight et al. | ................. | 709/225 |
| 7,058,973 B1 * | 6/2006 | Sultan | ............................. | 726/12 |
| 7,184,437 B1 | 2/2007 | Cole et al. | | |
| 7,194,767 B1 * | 3/2007 | Boydstun et al. | ............... | 726/14 |
| 8,274,979 B2 * | 9/2012 | Bragagnini et al. | .......... | 370/392 |
| 8,553,542 B1 * | 10/2013 | Szabo et al. | ................... | 370/230 |
| 2002/0138622 A1 * | 9/2002 | Dorenbosch et al. | ......... | 709/227 |
| 2006/0248581 A1 * | 11/2006 | Sundarrajan et al. | ........... | 726/12 |
| 2007/0043876 A1 * | 2/2007 | Varga et al. | ..................... | 709/245 |
| 2007/0162968 A1 * | 7/2007 | Ferreira et al. | ................... | 726/12 |
| 2008/0013524 A1 * | 1/2008 | Hwang et al. | ................. | 370/352 |
| 2008/0044181 A1 | 2/2008 | Sindhu | | |
| 2009/0135837 A1 * | 5/2009 | Mohaban | ....................... | 370/400 |
| 2010/0153560 A1 * | 6/2010 | Capone et al. | ................ | 709/227 |
| 2010/0175123 A1 * | 7/2010 | Karino et al. | .................. | 726/12 |
| 2011/0219123 A1 * | 9/2011 | Yang et al. | ..................... | 709/227 |
| 2012/0110194 A1 * | 5/2012 | Kikkawa et al. | .............. | 709/227 |
| 2013/0054762 A1 * | 2/2013 | Asveren | ........................ | 709/220 |

OTHER PUBLICATIONS

Nicholas Diel, Kaustubh Gadhari, Andrea Steiner, Steve DiBenedetto, Christos Papadopulos: "Characterizing TCP resets in established connections", Technical Report, Computer Science Department, Colorado State University, Sep. 10, 2008, 10 pages.*

(Continued)

*Primary Examiner* — Catherine Thiaw
(74) *Attorney, Agent, or Firm* — Shumaker & Sieffert, P.A.

(57) ABSTRACT

Techniques are described for providing secure network address translation (NAT) in a NAT device that provides endpoint-independent mapping (EIM) and endpoint-independent filtering (EIF) operations.

18 Claims, 3 Drawing Sheets

(56) References Cited

OTHER PUBLICATIONS

Stefan Nilsson and Gunnar Karlsson: "Fast address lookup for Internet routers", Proceedings of Algorithms and Experiments (ALEX 98), Trento, Italy, Feb. 9, 1998, p. 9-18.*

R. Penno, S. Kamiset, S. Perreault, M. Boudacair: "Network Address Translation (NA)) Behavioral Updates", draft-penno- behave-rfc4787-5382-5508-bis-02, Nov. 16, 2011.*

F. Gont "TCP's reaction to soft errors", RFC 5461, 12 pages, 2009.*

U.S. Appl. No. 12/182,619, by Jerome P. Moisand, filed Jul. 30, 2008.

U.S. Appl. No. 13/172,556, by Apurva Mehta, filed Jun. 29, 2011.

U.S. Appl. No. 13/350,545, by Suresh Kumar Vinapamula Venkata, filed Jan. 13, 2012.

U.S. Appl. No. 13/326,903, by Sarat Kamisetty, filed Dec. 15, 2011.

Donley et al., "Deterministic Address Mapping to Reduce Logging in Carrier Grade NATs draft-donley-behave-deterministic-cgn--00" Network Working Group, Internet-Draft, IETF Trust, Sep. 26, 2011, 10 pp.

Audet et al, "Network Address Translation (NAT) Behavioral Requirements for Unicast UDP," Network Working Group, RFC: 4787, Jan. 2007, 30 pp.

Guha et al., "NAT Behavioral Requirements for TCP," Network Working Group, RFC: 5382, Oct. 2008, 22 pp.

Srisuresh et al., "NAT Behavioral Requirements for ICMP," Network Working Group, RFC: 5508, Apr. 2009, 30 pp.

Penno et al., "Network Address Translation (NAT) Behavioral Requirements Updates," draft-penno-behave-rfc4787-5382-5508-bis-01, Internet-Draft, Oct. 10, 2011, 11 pp.

Harrington et al., "An Architecture for Describing Simple Network Management Protocol (SNMP Management Frameworks," Network Working Group, RFC: 3411, Dec. 2002, 60 pp.

* cited by examiner

SECURE NETWORK ADDRESS TRANSLATION

The application claims the benefit of U.S. Provisional Patent Application No. 61/556,003, filed Nov. 4, 2011, the entire contents of which are incorporated herein by reference.

TECHNICAL FIELD

The invention relates to computer networks and, more particularly, to network address translation in computer networks.

BACKGROUND

A computer network generally includes a number of interconnected network devices. Large networks, such as the Internet, typically include a number of interconnected computer networks, which in this context are often referred to as sub-networks or subnets. These subnets are each assigned a range of network addresses that can be allocated to the individual network devices that reside in the respective subnet. A server in each subnet may be responsible for allocating these network addresses in accordance with a network address allocation protocol, such as a dynamic host configuration protocol (DHCP).

Service provider networks typically assign private network addresses to the subscriber equipment (e.g., cable modems, DLS modems, mobile devices) utilized by their customers. For example, a DHCP server or Radius server may dynamically assign a private address to a subscriber equipment upon establishing a network connection for the subscriber equipment. When not in use, the network connection is torn down and the private address is returned to a pool of provider addresses utilized within the service provider network. These private addresses are not routable outside the service provider network. Instead, a network address translation (NAT) device translates the private addresses currently used by each subscriber equipment to public network addresses that are routable within a public network, such as the Internet. Large service provider networks, such as mobile service provider networks, may utilize Carrier Grade NAT (CGN) devices that are designed to handle hundreds of thousands or millions of subscriber sessions each day.

In general, NAT devices are often required to operate in a manner that provides endpoint-independent mapping (EIM) and endpoint-independent filtering (EIF) to provide stable reachability to private subscriber equipment from the public network. That is, for EIM, any current mapping between an internal network address/port of a subscriber to a public network address/port for that subscriber is used for subsequent packets associated with that subscriber regardless of the external address with which the subscriber is communicating. For EIF, the NAT device accepts and forwards to an internal subscriber any incoming packet that are destined for public network address/port to which the subscriber's private address/port are currently mapped regardless of the external address from which the packets were sourced. As such, sending an initial packet from the subscriber through the NAT device to any external network address is sufficient to allow back through the NAT device and packets that are destined for the subscriber regardless of the external network address that sourced the packets. Further example details of NAT, including EIM and EIF operations for NAT devices, are described in "Network Address Translation (NAT) Behavioral Requirements for Unicast UDP," RFC 4787, Internet Engineering Task Force (IETF), January 2007; "NAT Behavioral Requirements for TCP," RFC5382, IETF, October 2008, and "NAT Behavioral Requirements for ICMP," RFC 5508, IETF, April 2009, the entire contents of each of which are incorporated herein by reference.

SUMMARY

In general, techniques for secure network address translation (NAT) are described. In one example, a NAT device provides mechanisms for controlling the behavior of endpoint-independent mapping (EIM) and endpoint-independent filtering (EIF) operations of the device. The techniques described herein may allow NAT devices that implement EIM and EIF a degree of security from network attacks, unlike conventional NAT devices.

In one embodiment, a network device comprises a plurality of interfaces configured to send and receive packets for communication sessions associated with subscribers of a service provider network. The device includes a database storing network address translation (NAT) bindings that map private network addresses of the subscribers to public network addresses, wherein the database stores session data for the communication sessions associated with the NAT bindings. A NAT controller provides network address translation for the packets to translate between the private network addresses the public network addresses. The device includes an interface, such as a user interface, that provides a refresh control input to control refresh of the communication sessions associated with the NAT bindings. The NAT controller maintains a session timer for each of the communication sessions and removes session data for a communication session from the database when the session timer indicates that packets have not been detected on the communication session for a threshold amount of time. In accordance with the refresh control input, the NAT controller restarts the respective session timer the communication sessions upon detecting packets flowing in one direction for the communication session without restarting the session timer upon detecting packets flowing in an opposite direction for the communication session.

In another embodiment, a method comprises receiving, with a network device, packets for a communication session associated with a subscriber of a service provider network, and processing the packets with the network device to translate between a private network address of the subscriber and the public network addresses. The method further comprises maintaining a session timer for the communication sessions that indicates when packets have not been detected on the communication session for a threshold amount of time, and restarting the session timer the communication sessions upon detecting packets flowing in one direction for the communication session without restarting the session timer upon detecting packets flowing in an opposite direction for the communication session.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
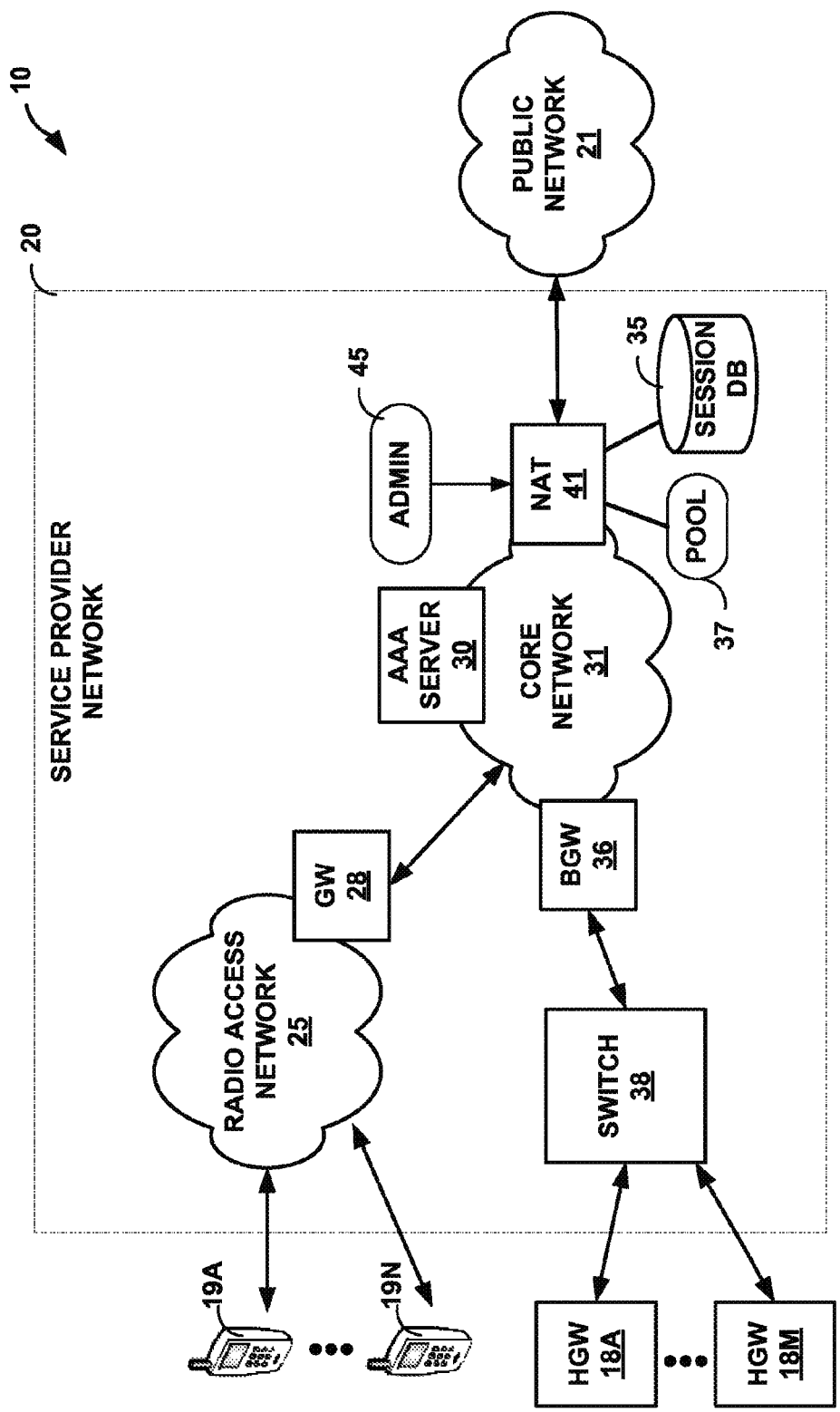
FIG. 1 is a block diagram illustrating an exemplary network system that implements the network address translation techniques described in this disclosure.

FIG. 1 is a block diagram illustrating an exemplary network system 10 that implements the network address translation techniques described in this disclosure. As shown in the example of FIG. 1, network system 10 includes a service provider network 20 and a public network 21. In the example of FIG. 1, service provider network 20 operates as a private network that provides packet-based network access to home gateways ("HGWs") 18A-18M that service endpoint computing devices, such as personal computers, laptop computers or other types of computing device associated with subscribers. In addition, service provider network 20 may provide data services to cellular mobile devices 19A-19N. Mobile devices 19 may comprise, for example, a mobile telephone, a laptop or desktop computer having, e.g., a 3G wireless card, a wireless-capable netbook, a video game device, a pager, a smart phone, or a personal data assistant (PDA). Each of mobile devices 19 may run one or more applications, such as mobile calls, video games, videoconferencing, and email, among others.

In the example of FIG. 1, HGWs 18 connect to a broadband network gateway (BGW) 36 via network switch 38. In one example, HGWs may be DSL modems and network switch 38 may comprise a digital subscriber line access multiplexer (DSLAM) or other switching device. Each of HGWs 18 may utilize a Point-to-Point Protocol (PPP), such as PPP over ATM or PPP over Ethernet (PPPoE), to communicate with network switch 38. For example, using PPP, one of HGWs 18 may request access to core network 31 core network 31 and provide login information, such as a username and password, for authentication by AAA server 30. PPP may be supported on lines such as digital subscriber lines (DSLs) that connect endpoint computing devices 18 with network switch 38. In other embodiments, endpoint computing devices 18 may utilize a non-PPP protocol to communicate with network switch 38. Other embodiments may use other lines besides DSL lines, such as cable, Ethernet over a T1, T3 or other access links.

Network switch 38 may communicate with broadband network gateway 36 over a physical interface supporting various protocols, e.g., ATM interface supporting ATM protocols. Broadband network gateway 36 typically includes Broadband Remote Access Server (BRAS) functionality to aggregate output from switches into a higher-speed uplink to core network 31. In some embodiments, broadband network gateway 36 may comprise a router that maintains routing information between endpoint computing devices 18 and core network 31.

Service provider network 20 may also include radio access network 25 in which one or more base stations communicate via radio signals with mobile devices 19. Radio access network 25 is a transport network that enables base stations to exchange packetized data with core network 31 of the service provider, ultimately for communication with packet data network 21. Radio access network 25 typically comprises communication nodes interconnected by communication links, such as leased land-lines or point-to-point microwave connection. The communication nodes comprise network, aggregation, and switching elements that execute one or more protocols to route packets between base stations and gateway device ("GW") 28. Core network 31 provides session management, mobility management, and transport services between backhaul network 27 and core network 31 to support access, by mobile devices 19, to public network 21 and services of protected resources 14. Core network 31 may comprise, for instance, a general packet radio service (GPRS) core packed-switched network, a GPRS core circuit-switched network, an IP-based mobile multimedia core network, or another type of transport network. Core network 31 typically includes one or more packet processing nodes to support firewall, load balancing, billing, deep-packet inspection (DPI), and other services for mobile traffic traversing the mobile core network.

AAA server 30 is typically an authentication, authorization and accounting (AAA) server to authenticate the credentials a subscriber requesting a network connection. The AAA server 30 may be integrated within a router or gateway of broadband network or on a separate network device and may be, for example, a Remote Authentication Dial-In User Service (RADIUS) server. Upon authenticating a network access request from either an HGW 18 or a mobile device 19, AAA server 30 assigns a private layer three (L3) network address (e.g., an IPv4 network address) for receiving data services within service provider network 20. This may be accomplished in a variety of ways. For example, the private network address may be statically configured on the subscriber device or may be dynamically or statically assigned by AAA server 30 (or gateway 28). Typically, upon authentication of the subscriber, AAA server 30 selects a private IP address from a pool of private network addresses. In some cases, BGW 36 or GW 28 may send a Radius authentication request to AAA server 30 for authentication and assignment of an IP address.

Network address translation (NAT) device 31 provides network address translation for private network addresses routable within service provider network to public network addresses routable within public network 21. That is, upon detecting an outbound packet from core network 31 for a new communication session with a destination address within public network 21, NAT device 41 selects a public address and port for use in association with the subscriber's communication session. Upon assigning the public address and port, NAT device 41 updates session database 35 to record the NAT binding between the public address/port and the subscriber's private address/port. In addition, NAT device 41 updates session database 35 to associate the session with the NAT binding. In one example, NAT device 41 may select a public network address and port for the new session from free pool 37, which represents a pool of currently unused public network addresses associated with service provider network 20. In another example, NAT device 41 applies a source network address and port translation (NAPT) mechanism for deterministically mapping between a subscriber's private network address to a public address and port range (i.e., a block of a plurality of contiguous ports). Further details of techniques for deterministic network address translation can be found in U.S. patent application Ser. No. 13/350,545, "LOAD BALANCING DETERMINISTIC NETWORK ADDRESS TRANSLATION ACROSS SESSION MANAGEMENT MODULES," filed Jan. 13, 2012, the entire contents of which are incorporated herein by reference.

Upon assigning the public address and port, NAT device 41 performs network address translation to translate the private source network address and source port within the outbound packet to the computed public network address and the assign port number. During this process NAT device 41 may replace all or a portion of a header (e.g., IP or UDP header) of the packet prior to forwarding the packet to public network 21. Upon receiving an inbound packet from public network 21, NAT device 41 access session database 35 to identify a current NAT entry for the communication session and maps the public destination network address and the destination port to the corresponding private network address and port. NAT device 41 may then replace all or a portion of a header (e.g., IP or UDP header) within the packet prior to forwarding the packet to core network 31.

In general, NAT device 41 supports endpoint-independent mapping (EIM) and endpoint-independent filtering (EIF). For example, for EIM, any current mapping within session database 35 between an internal network address/port of a subscriber to a public network address/port for that subscriber may be used for subsequent packets associated with that subscriber regardless of the external address with which the subscriber is communicating. For EIF, NAT device 41 may accept and forward to an internal subscriber any incoming packet that is destined for a public network address/port to which the subscriber's private address/port are currently mapped within session database 35. However, as described herein, NAT device 41 provides mechanisms that allow fine-grain control over the behavior of EIM and EIF operations of the NAT device. The mechanisms allow NAT device 41 to implement EIM and EIF in a manner that is secure from network attacks, unlike conventional NAT devices that implement EIM and EIF.

As an example, NAT device 41 may support a user interface that provides a control mechanism (e.g., a selector, menu, toggle, text-based command or other mechanism) that allows an administrator 45 or a network management system to specify a configurable limit to the number of sessions that can be created by external parties for a given NAT binding (i.e., private/public address and port mapping) within session database 35. That is, in accordance with EIM/EIM, NAT device 41 forwards inbound packets that are destined for current NAT bindings for internal subscriber endpoints 18, 19. Inbound packets received from public network 21 typically result in new communication sessions being recorded within session database 35 in association with existing NAT bindings when the packets originate from new external source addresses/ports. Unlike conventional devices, the control mechanism of NAT device 41 allows administrator 45 to specify how many sessions can be created by inbound packets that match a NAT binding within session database 35. For example, a configured value of ten (10) unsolicited inbound packets may be set to provide a cap of 10 concurrent sessions for an existing NAT binding for a private subscriber address/port. The user interface of NAT device 41 may allow this configurable parameter to be specified on a per-subscriber basis, thereby providing enhanced flexibility. In one example, NAT device 41 provides the user interface by way of a configuration protocol, such as the Simple Network Management Protocol (SNMP). Further details regarding SNMP can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

As another example, the user interface of NAT device 41 may provide a refresh control mechanism that allows an administrator 45 or management system to control the refresh behavior of current NAT mappings within session database 35. For example, NAT device 41 employs a purge mechanism that removes a session recorded against NAT bindings in session database 35 when the session has been inactive for a configurable period. In conventional NAT devices, unsolicited inbound packets from external sources destined for current NAT bindings (i.e., destined for public address currently assigned to private subscribers) may cause the NAT devices to refresh the session timers associated with the NAT bindings for those subscribers. Moreover, in accordance with EIF, the conventional NAT devices may be required to forward the unsolicited inbound packets to the private subscribers, which may cause the subscribers to reply with certain session error messages in the event the subscribers have ceased communicating on the session. In conventional NAT devices, these signaling messages originating from the private subscribers in response to unsolicited inbound packets may also cause the NAT devices to refresh the session timers associated with the NAT bindings. In either case, conventional NAT devices supporting EIF may maintain excessive, stale session state information.

As described herein, the refresh control mechanism provided by NAT device 41 provides administrator 45 with configurable control of the refresh of the session mappings. In one example, administrator 45 may specify that session timer refresh for NAT bindings within session database 35 occurs in response to: (1) inbound-only packets, (2) outbound-only packets or (3) inbound and outbound packets. Moreover, administrator 45 may configure the controls on a per-subscriber basis.

For example, the inbound-only setting specifies that any inbound packet received from public network 21 will not refresh the session timers of a NAT binding in session database 35 even though the packet may designate the proper public destination address of the NAT binding. In this setting, only outbound packets received from a subscriber endpoint device 18, 19 that uses the public address of the NAT binding will cause the NAT binding to be refreshed.

Moreover, the user interface of NAT device 41 may support a control mechanism that allows administrator 45 to control refresh behavior of the NAT bindings within session database 35 with respect to outbound signaling messages received by the NAT device. For example, administrator 45 may determine that certain types of outbound packets should not refresh the session timers for a NAT binding. For example, administrator 45 may designate that session timers for NAT bindings should not be refreshed by ICMP Error or TCP RST outbound packets, which may be sent in response to unsolicited inbound packets. In this case, packets from internal subscriber devices 18, 19 that are replies indicating session errors are ignored for refreshing session timers even though the packets originate from an internal subscriber associated with a current NAT binding within session database 35. Moreover, administrator 45 may configure the handling of outbound signaling messages on a per-subscriber basis.

As another example, NAT device 41 may be configured to automatically remove NAT bindings from session database 35 in the event the NAT device detects certain outbound signaling messages for a session. For example, NAT device 41 may be configured to immediately remove a session and the corresponding NAT binding for an internal subscriber upon receiving an outbound error message (e.g., a TCP RST or ICMP Error) on the first communication session that resulted in the creation of the NAT mapping. As such, in the event an external device sends an unsolicited inbound packet that would otherwise result in a new session and port binding but the response from the internal subscriber is an error message, then NAT device 41 does not refresh original NAT binding but removes the binding and the session state information from session database 35 immediately.

In some cases NAT device 41 may be configured to specifically block or otherwise not accept unsolicited packets from defined network prefixes. Rather than merely dropping the packets, NAT device 41 may update session database 35 or internal session cache to temporarily record sessions for NAT bindings in response to the unsolicited inbound packets. These special sessions, referred to herein as "drop sessions" provide session connectivity but drop all packets associated with the session. For example, session database 35 or internal session tables of NAT device 41 may be updated to install session state information associated with the unsolicited packet. This relatively small session table or cache may quickly be searched for subsequent packets prior to performing a full lookup on the packet header, allowing NAT device to efficiently associate the packets with drop sessions for filtering. This technique of forming drop sessions, rather than merely dropping each packet, may advantageously avoid resources that are typically consumed with longest prefix match lookups for packets that may otherwise need to be performed when processing packets for the same external source address of a blocked network prefix. That is, without temporarily creating the drop session, conventional NAT devices may repeatedly perform complex longest prefix matches to determine and select appropriate policies for an incoming packet. This process may be computationally intensive due to the high number of policies for various prefix levels. However, creating a special drop session upon detecting a particular session (i.e., a specific five tuple of source address/port, destination address/port, protocol) from a blocked prefix eliminates the need to repeat the lookup for subsequent packets of the same flow. In some cases NAT device 41 may be further configured to cap the maximum number of drop sessions to be created for a particular NAT binding, thereby capping the amount of state information created.

In this way, NAT device 41 provides mechanisms for controlling the behavior of endpoint-independent mapping (EIM) and endpoint-independent filtering (EIF) operations. Moreover, the techniques described herein may allow NAT device 41 to implement EIM and EIF in a manner that provides security and performance improvement from network attacks or other unsolicited inbound network traffic. The techniques allow the security mechanisms to be applied on a per-subscriber basis, thereby provide fine-grain security.

Figure 2:
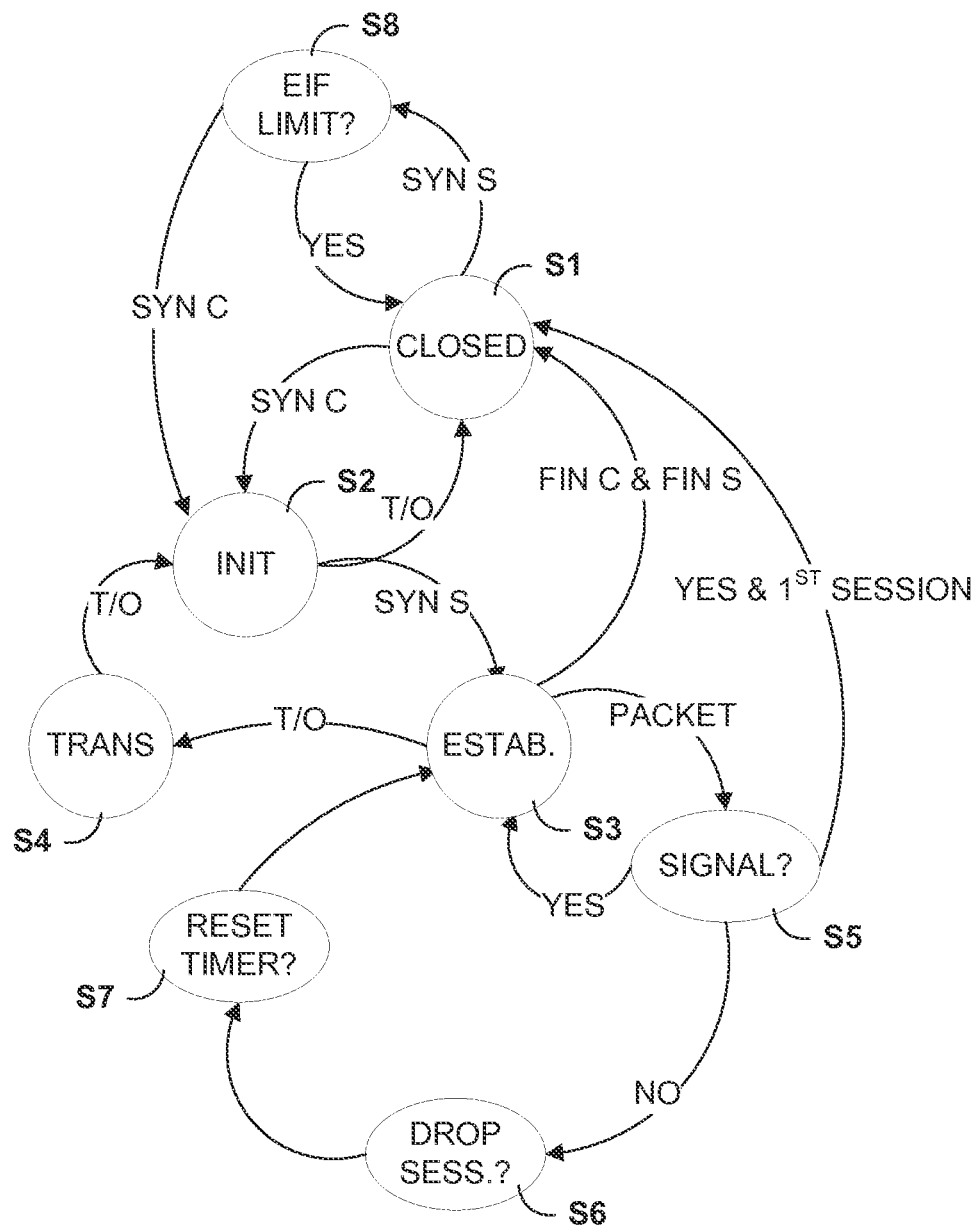
FIG. 2 is a state machine illustrating example operation of a NAT device in accordance with the techniques described herein.

FIG. 2 is a state machine illustrating example operation of NAT device 41. In the example of FIG. 2, NAT device 41 operates within a first state S1 prior to creation of a first TCP session for a subscriber. Upon detecting a session establishment message, such as a TCP SYN message, in IPv4, NAT device 41 transitions to an INIT state S2. At this time, NAT device 41 selects a public address and port for use in association with the subscriber's communication session. Upon assigning the public address and port, NAT device 41 updates session database 35 to record the NAT binding between the public address/port and the subscriber's private address/port. In addition, NAT device 41 updates session database 35 to associate the initial session with the NAT binding. In the event a response session establishment message from the external device is not received within a defined time period, NAT device 41 removes the state information for the TCP session and transitions back to the CLOSED state S1.

Upon receiving a response session establishment message from the external device, NAT device 41 transition to state S3 indicating that the TCP session has been established between the devices. Once established, NAT device 41 monitors maintains a session based on session packet flow. In the event the timer expires due to session inactivity, NAT device 41 considers the session a candidate for removal and transitions to a transitory connection state S4. In the event a second timer expires due to further session inactivity, NAT device 41 removes the state information for the TCP session and transitions back to the CLOSED state S1.

Upon receiving a packet associated with the session, NAT device 41 determines whether the user has selected a security mechanism that controls refresh of the TCP timers based on whether the packet is an outbound signaling messages. For example, administrator 45 may configure NAT device 41 to ignore certain types of outbound signaling messages, such as ICMP Error or TCP RST outbound packets, which may be sent in response to unsolicited inbound packets. In the event the detected packet is such a signaling message and administrator 45 has enabled this security mechanism, NAT device 41 transitions back to state S3 without refreshing the session timer associated with the TCP session. Moreover, in the event NAT device 41 has been configured to immediately remove a session and the corresponding NAT binding for an internal subscriber upon receiving an outbound error message (e.g., a TCP RST or ICMP Error) on the first communication session that resulted in the creation of the NAT mapping, NAT device 41 removes the session state for the TCP flow as well as the NAT binding within session database 35 and transitions base to CLOSED state S1.

In the event the packet is not an outbound signalling message, or the security mechanism associated therewith is disabled, NAT device 41 determines whether the session is a "drop session." In this case, NAT device 41 drops the packet in state S6.

In state S7, NAT device 41 applies the security mechanisms described herein to determine whether to reset the session timer associated with the TCP session. For example, in state S7, NAT device 41 compares the interface on which the packet was received with the security settings for refresh control. In the event of a match, such as the packet was an outbound packet and refresh control has been set to outbound only or both inbound and outbound packets, then NAT device 41 refreshes the timer and transitions to state S3. Alternatively, in the event the packet type (inbound or outbound) does not match the refresh control setting for the subscriber, NAT device 41 transitions to state S3 without resetting the timer.

In some cases, NAT device 41 may receive an unsolicited session request message from an external public address and destined for a legitimate NAT binding, such as a SYN message from a public "server" (SYN S of FIG. 2). In this case, NAT device 41 transitions to state S8 and determines whether administrator 45 has specified a configurable limit to the number of sessions that can be created by external parties for a given NAT binding. If so, and the newly requested session would exceed the limit, NAT device 41 returns to state 51. If the security mechanism has not been enabled for the subscriber, or the specified limit would not be exceeded, NAT device 41 proceeds to INIT state S2 upon forwarding the session request message to the private subscriber and receiving a response message, such as a SYN TCP message.

The following pseudocode illustrates example text-based command that may be supported by a user interface of NAT device Y. In this example, the "show" command followed by the input parameters "services nat" cause NAT device X to output current configuration settings for the NAT services:

```
>show services nat
        rule napt_r1 {
            match-direction output;
            term t1 {
                then {
                    translated {
                        source-pool napt_pool1;
                        translation-type {
                            napt-44;
```

```
                }
                mapping-type endpoint-independent;
+               secure-nat-mapping {
+                   mapping-refresh inbound;
+                   eif-flow-limit 10;
+               }
                filtering-type {
                    endpoint-independent;
                }
              }
            }
          }
        }
        >show services
        service-set napt_ss1 {
+           max-drop-flows ingress 10 egress 5;
            nat-rules napt_r1;
            interface-service {
        service-interface sp-0/1/0;
            }
        }
```

In this example, the text-based commands specify configuration data for a specific subscriber, i.e., traffic associated with network interface "sp-0/1/0" of the NAT device. The configuration data first specifies a maximum number of drop sessions for the interface using the keyword "max-drop-flows." Next, the commands assign a NAT rule "napt_r1" for the interface, where the NAT rule is defined by the preceding configuration commands. As illustrated above, the keyword "rule" allows a stanza of settings for the rule to the defined. The commands support a keyword "secure-nat-mapping," which allows the user to specify an inner stanza of configuration parameters specifically for secure NAT as described herein. In the example, the keyword "mapping-refresh" allows the user to control session timer refresh for NAT bindings. In this example, the configuration data species mapping refresh for inbound only packets. In addition, the configuration data specifies a limit of ten (10) EIF sessions that can be created for each unique NAT binding.

Figure 3:
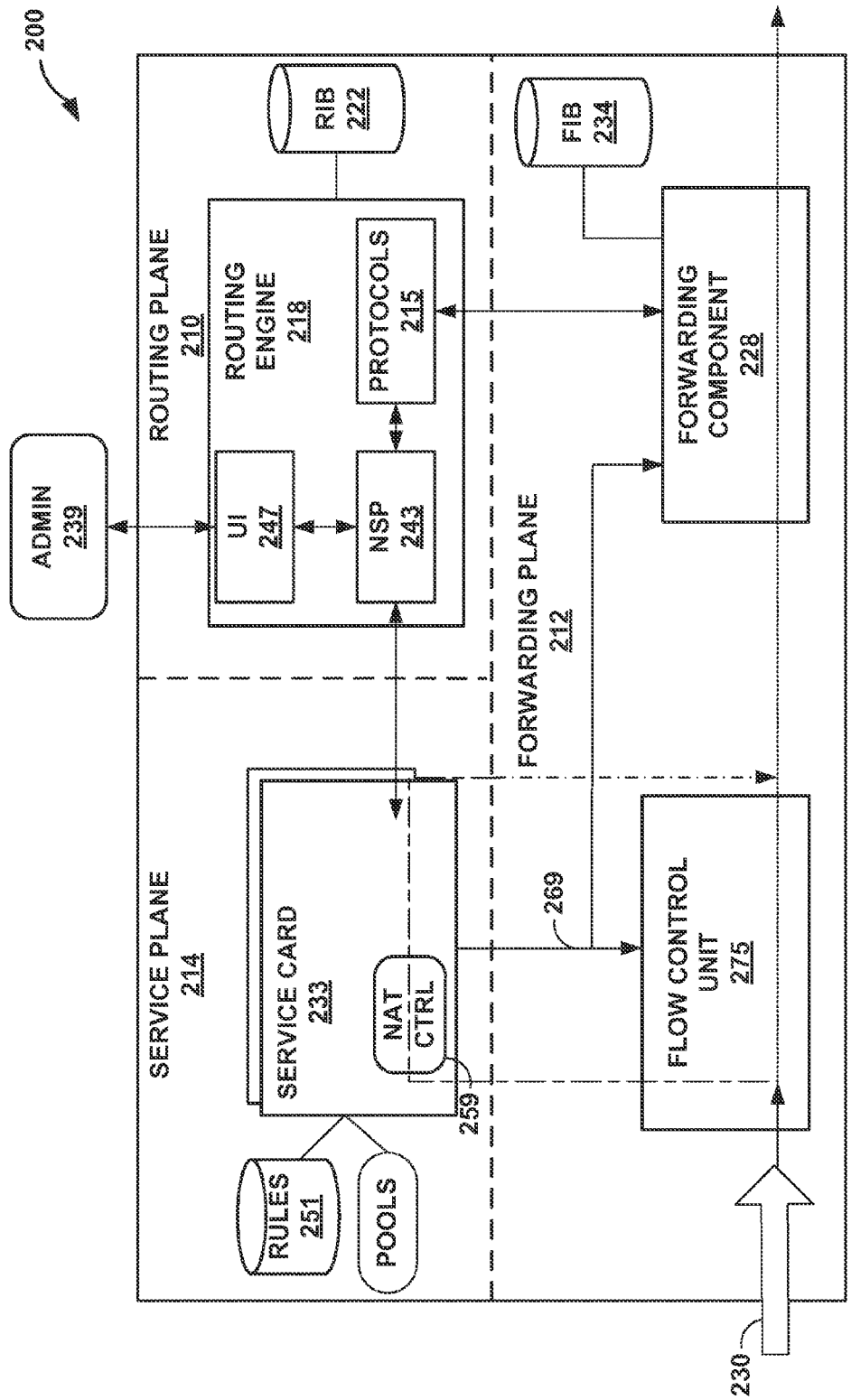
FIG. 3 illustrates an example network device that incorporates the NAT functions described herein.

FIG. 3 illustrates an example network device 200 that incorporates the NAT functions described herein. In this example, network device 200 may be a standalone device or a router or gateway device, such as BGW 36 or GW 28. Network device 200 may perform the functions described above with respect to NAT device 41 of FIGS. 1-3. As such example, network device 200 may, for example, be a high-end router or gateway capable of deployment within a service provider network.

In the example of FIG. 3, the components of network device 200 may be logically organized into a routing plane 210, a forwarding plane 212 and a service plane 214 having a plurality of session management cards (service cards 233). Routing plane 210 provides a routing engine 218 that is primarily responsible for maintaining a routing information base (RIB) 222 to reflect the current topology of a network and other network entities to which network device 200 is connected. For example, routing engine 218 provides an operating environment for execution of routing protocols 215 that communicate with peer routers and periodically update RIB 222 to accurately reflect the topology of the network and the other network entities. Example protocols include routing and label switching protocols, such as BGP, ISIS, RSVP-TE and LDP. In some embodiments, network device 200 may be a mobile gateway having a distributed control plane for handling mobile subscribers, such as described within U.S. patent application Ser. No. 13/172,556, entitled "MOBILE GATEWAY HAVING DECENTRALIZED CONTROL PLANE FOR ANCHORING SUBSCRIBER SESSIONS," hereby incorporated herein by reference. In this case, as a mobile gateway, device 200 may have a plurality of session management cards, each handling control functions for a plurality of the subscriber sessions. Each of the session management cards may perform the deterministic NAT techniques described herein for the subscriber sessions assigned to the session management card.

Forwarding plane 212 receives and forwards packets associated with network packet flows 230. Forwarding component 228 maintains forwarding information base (FIB) 234 in accordance with RIB 222, which associates network destinations or MPLS labels with specific next hops and corresponding interface ports of output interface cards of network device 200. Routing engine 218 typically processes RIB 222 to perform route selection and generate FIB 234 based on selected routes. In this way, next hop information may be programmed into forwarding plane 212. Routing engine 218 may generate FIB 234 in the form of a radix tree having leaf nodes that represent destinations within the network. U.S. Pat. No. 7,184,437, the contents of which is incorporated herein by reference in its entirety, provides details on an exemplary embodiment of a router that utilizes a radix tree for route resolution.

When forwarding a packet, forwarding component 228 traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface. Forwarding plane 212 may be provided by dedicated forwarding integrated circuits normally associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

In this way, as shown in the example embodiment of FIG. 3, network device 200 integrates service plane 214 and routing plane 210 to utilize shared forwarding plane 212. Forwarding plane 212 may be a rich and dynamic shared forwarding plane, optionally distributed over a multi-chassis router. Moreover, forwarding plane 212 may be provided by dedicated forwarding integrated circuits normally associated with high-end routing components of a network router. Consequently, routing plane 210 and forwarding plane 212 may operate as a high-end router or gateway, and service plane 214 has been tightly integrated within network device 200 (e.g., by way of service cards 233) so as to use forwarding plane 212 of the routing components in a shared, cooperative manner. Further details of one example embodiment of network device 200 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," the entire contents of which is incorporated herein by reference.

Network services process (NSP) 243 of routing engine 46 communicates with and programs service cards 233 of service plane 214. For example, routing engine 218 may present a user interface (UI) 247 to receive configuration data from administrator 239 defining NAT rules 251. In response, NSP 243 programs services cards 233 with corresponding configuration data, causing the service cards of service plane 214 to perform the functions described herein when processing packets redirected from forwarding plane 212. One or more of service cards 233 may, for example, execute NAT controller (NAT CTRL) 259 that operates on packets for new subscriber communication flows to apply NAT services in a secure manner as described herein. That is, NAT controller 259 applies network address translation to subscriber flows, including the mechanisms described herein for controlling the behavior of endpoint-independent mapping (EIM) and endpoint-independent filtering (EIF) operations. For example, each NAT controller 259 executing on each service card 233 may operate in accordance with the state machine of FIG. 2 and apply the secure NAT services described herein.

Forwarding plane 212 may include a flow control unit 275 to selectively direct packets of newly detected communication sessions to service plane 214 for processing. For example, flow control unit 275 receives incoming packet flows 230 (e.g., outbound subscriber traffic) and determines whether to send the packets through the service plane 214 for processing within one or more of service cards 233, or whether to bypass the service plane 214. Service cards 233 receive packets from flow control unit 275, select a public network address and port for the communication flow, configure forwarding component 228 in accordance with the computed information and relay the packet or any response packets to forwarding plane 212 for forwarding by forwarding component 228 in accordance with FIB 234.

Service cards 233 within service plane 214 may be installed along a backplane or other interconnect of network device 200 to perform a variety of other services on the packets received from forwarding plane 212, such as filtering, logging, Intrusion Detection and Prevention (IDP) analysis, virus scanning, deep packet inspection. In some cases, service card 233 may issue commands 269 to dynamically configure a flow table within flow control unit 275 of forwarding plane 212. For example, when flow control unit 275 receives a packet and determines that the packet belongs to a new packet flow that does not match any of its filters, flow control unit 275 may send the packet to service cards 233 for processing and assignment of a public address and port, as described for exemplary purposes with respect to FIGS. 1 and 2.

Upon receiving and processing the packet or packets of a packet flow, service cards 233 may issue a command 269 to install a dynamic filter within the flow table, such as an exact match filter that indicates particular actions to be performed when a packet is received that matches the filter. For example, upon processing an initial packet of a flow to compute the public network address and port, NAT controller 259 of service cards 233 may output commands 269 to program this information into forwarding component 228. In addition, NAT controller 259 may output commands 269 to install a filter within flow control unit 275 to specify that subsequent packets of this packet flow session may be processed on a straight path that bypasses service plane 214. When flow control unit 275 receives a subsequent packet of the same packet flow, flow control unit 275 checks the flow table, determines that the packet matches the new dynamic filter, and directs the packet on the appropriate path according to the dynamic filter. As such, subsequent inbound and outbound packets of the packet flow may be processed directly by forwarding component 228 for network address translation and network forwarding.

In one example embodiment, the user interface 247 provides a command line interface in which a syntax supports a new NAT translation-type keyword of "deterministic-napt44." When this translation type is configured in a NAT rule 251 by administrator 239, the NAT control 259 repeatedly and deterministically maps a subscriber to the same public network address and a specific port range for that network address. Once the public address and port range for a subscriber are computed, the particular ports for each session for that subscriber are allocated dynamically within the computed NAT port range on per session basis. Moreover, techniques deterministic NAT functions in network device 200 may be load-balanced in which subscriber sessions are distributed across plurality of service cards 233. Further details of techniques for applying deterministic NAT can be found in U.S. patent application Ser. No. 13/350,545, filed Jan. 13, 2012, entitled "LOAD BALANCING DETERMINISTIC NETWORK ADDRESS TRANSLATION ACROSS SESSION MANAGEMENT MODULES," the entire contents of which is incorporated herein by reference.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A network device comprising:
   a plurality of interfaces configured to send and receive packets for communication sessions associated with subscribers of a service provider network;
   a database storing network address translation (NAT) bindings that map private network addresses of the subscribers to public network addresses, wherein the database stores session data for the communication sessions associated with the NAT bindings;
   a NAT controller that provides network address translation for the packets to translate between the private network addresses the public network addresses;
   an interface that provides a refresh control input to control refresh of the communication sessions associated with the NAT bindings;
   wherein the NAT controller maintains a session timer for each of the communication sessions and removes session data for a communication session from the database when the session timer indicates that packets have not been detected on the communication session for a threshold amount of time,
   wherein, responsive to receiving outbound packets from the subscribers, the NAT controller processes each of the outbound packets to determine whether the outbound packet comprises an outbound data packet or an outbound error message, and
   wherein, in accordance with a security setting of the refresh control input, the NAT controller restarts the session timer in response to determining the outbound packet comprises an outbound data packet from the subscribers and does not restart the session timer in response to determining the outbound packet comprises an outbound error message sent by the subscribers in reply to inbound packets.

2. The network device of claim 1,
   wherein the NAT controller provides endpoint-independent mapping (EIM) and endpoint-independent filtering (EIF) that allows new communication sessions to be recorded within the database in response to inbound packets from a public network regardless of network source addresses within the inbound packets,
   wherein, in response to the refresh control input, the NAT controller restarts the session timer in response to outbound packets from the subscribers without restarting the timer in response to the inbound packets received from the public network.

3. The network device of claim 1, wherein the outbound error message from the subscribers include a TCP RST packet and an ICMP error packet.

4. The network device of claim 1, wherein, in response to the refresh control input, the NAT controller removes session data and removes a NAT binding from the session database upon detecting the outbound error messages in reply to the inbound packets.

5. The network device of claim 1, wherein the interface allows an administrator to specify a different refresh control mechanism for each of the subscribers.

6. The network device of claim 1,
   wherein the NAT controller provides endpoint-independent mapping (EIM) and endpoint-independent filtering (EIF) and records new communication sessions within the database in response to inbound packets from a public network regardless of network source addresses within the packets,
   wherein the interface provides an input mechanism to specify configurable limits for each of the subscribers, each of the configurable limits specifying a maximum number of the new communication sessions that can be created by the NAT controller for the respective subscriber in response to the inbound packets.

7. The network device of claim 1, further comprising a set of rules blocking inbound packets from one or more network prefixes of a public network,
   wherein in response to receiving a packet from a first one of the network prefixes, the NAT controller performs a lookup in the rules to determine a best-matching prefix and, upon determining the best-matching prefix, updates a session table to record a communication session marked as a drop session, and
   wherein, in response to receiving subsequent packets from the first one of the network prefixes, the NAT controller drops the packets based on association with the drop session without performing a lookup in the rules.

8. The network device of claim 1, wherein the network device comprises a router or a mobile gateway.

9. A method comprising:
   receiving, with a network device, packets for a communication session associated with a subscriber of a service provider network;
   processing the packets with the network device to translate between a private network address of the subscriber and a public network address;
   maintaining a session timer for the communication sessions that indicates when packets have not been detected on the communication session for a threshold amount of time,
   responsive to receiving outbound packets from the subscriber, processing each of the outbound packets to determine whether the outbound packet comprises an outbound data packet or an outbound error message, and
   restarting the session timer in response to determining the outbound packet comprises an outbound data packet from the subscriber and not restarting the session timer in response to determining the outbound packet comprises an outbound error message sent by the subscriber in reply to inbound packets.

10. The method of claim 9, further comprising:
    storing network address translation (NAT) bindings within a database, each of the NAT bindings mapping map private network addresses of subscribers of the service provider network to public network addresses;
    storing session data for the communication sessions associated with the NAT bindings; and
    discarding the session data for one of the communication session upon expiration of a respective session timer for the communication session.

11. The method of claim 9, further comprising:
    presenting an interface that provides a refresh control input to control refresh of the communication session;
    controlling the restart of the session timer in response to the refresh control input.

12. The method of claim 9,
    wherein processing the packets comprises providing endpoint-independent mapping (EIM) and endpoint-independent filtering (EIF) by permitting new communication sessions with the public network address of the subscriber in response to inbound packets from a public network regardless of network source addresses within the inbound packets,
    wherein restarting the session timer comprises restarting the session timer in response to outbound packets from the subscriber without restarting the timer in response to the inbound packets received from the public network.

13. The method of claim 9, wherein the outbound error message from the subscribers includes a TCP RST packet and an ICMP error packet.

14. The method of claim 9, further comprising removing session data and a NAT binding from a session database upon detecting one of the outbound error message in reply to the inbound packets.

15. The method of claim 9, further comprising:
   providing endpoint-independent mapping (EIM) and endpoint-independent filtering (EIF) by recording new communication sessions with the public network address of the subscriber upon receiving inbound packets from a public network regardless of network source addresses within the inbound packets,
   presenting an interface having an input mechanism to specify a maximum number of the new communication session that can be created for the subscriber in response to the inbound packets.

16. The method of claim 9, further comprising:
   storing a set of rules blocking inbound packets from one or more network prefixes of a public network,
in response to receive a packet from a first one of the network prefixes, performing a lookup in the rules to determine a best-matching prefix;
   upon determining the best-matching prefix, recording a communication session marked as a drop session; and
   in response to receiving subsequent packets from the first one of the network prefixes, dropping the packets based on association with the drop session without performing a lookup in the rules.

17. The method of claim 9, wherein the network device comprises a router or a mobile gateway.

18. A network router comprising:
   a plurality of interfaces configured to send and receive packets for communication sessions associated with subscribers of a service provider network;
   a routing engine comprising a control unit that executes a routing protocol to maintain routing information specifying routes through a network;
   a forwarding component configured by the routing engine to select next hops for the packets in accordance with the routing information, the forwarding component comprising a switch fabric to forward the packets to the interfaces based on the selected next hops; and
   a database storing network address translation (NAT) bindings that map private network addresses of the subscribers to public network addresses, wherein the database stores session data for the communication sessions associated with the NAT bindings;
   a NAT controller that provides network address translation for the packets to translate between the private network addresses the public network addresses;
   an interface that provides a refresh control input to control refresh of the communication sessions associated with the NAT bindings;
   wherein the NAT controller maintains a session timer for each of the communication sessions and removes session data for a communication session from the database when the session timer indicates that packets have not been detected on the communication session for a threshold amount of time,
   wherein, responsive to receiving outbound packets from the subscribers, the NAT controller processes the outbound packets to determine whether each of the outbound packets comprises an outbound data packet or an outbound error message, and
   wherein, in accordance with the refresh control input, the NAT controller restarts the respective session timer for each of the communication sessions associated with a respective subscriber in response to determining the outbound packet comprises an outbound data packet from the respective subscriber and does not restart the session timer in response to determining the outbound packet comprises an outbound error message sent by the respective subscriber in reply to inbound packets.

\* \* \* \* \*